United States Patent [19]

Gephardt et al.

[11] Patent Number: 5,369,777
[45] Date of Patent: Nov. 29, 1994

[54] INTEGRATED DIGITAL PROCESSING APPARATUS HAVING A SINGLE BIODIRECTIONAL DATA BUS FOR ACCOMMODATING A PLURALITY OF PERIPHERAL DEVICES CONNECTED TO A PLURALITY OF EXTERNAL BUSES

[75] Inventors: Douglas D. Gephardt; James R. MacDonald; Govinda V. Kamath, all of Austin, Tex.

[73] Assignee: Advanced Micro Devices, Inc., Sunnyvale, Calif.

[21] Appl. No.: 71,940

[22] Filed: Jun. 3, 1993

Related U.S. Application Data

[63] Continuation of Ser. No. 576,012, Aug. 31, 1990, abandoned.

[51] Int. Cl.⁵ .................... G06F 3/00; G06F 13/00
[52] U.S. Cl. .................... 395/800; 395/275;
364/238.3; 364/239; 364/240; 364/240.5;
364/242.33; 364/251.7; 364/DIG. 1
[58] Field of Search .......... 395/800, 425, 275, 500, 395/200

[56] References Cited

U.S. PATENT DOCUMENTS

| | | | |
|---|---|---|---|
| 3,680,054 | 7/1972 | Bunker et al. | 395/275 |
| 3,996,564 | 12/1976 | Kerrigan et al. | 395/275 |
| 4,053,950 | 10/1977 | Bourke et al. | 395/275 |
| 4,349,870 | 9/1982 | Shaw et al. | 395/800 |
| 4,396,980 | 8/1983 | Hingarh | 395/800 |
| 4,571,671 | 2/1986 | Burns et al. | 364/200 |
| 4,644,496 | 2/1987 | Andrews | 395/800 |
| 4,688,170 | 8/1987 | Waite et al. | 395/500 |
| 4,847,750 | 7/1989 | Daniel | 395/425 |
| 4,855,730 | 8/1989 | Venners et al. | 340/825.24 |
| 4,933,845 | 6/1990 | Hayes | 395/375 |
| 4,964,033 | 10/1990 | Williams | 395/800 |
| 4,964,046 | 10/1990 | Mehrgardt et al. | 395/250 |
| 4,965,801 | 10/1990 | Dulac | 371/40.1 |
| 4,969,121 | 11/1990 | Chan et al. | 395/325 |
| 5,017,993 | 5/1991 | Shibata | 357/40 |
| 5,058,001 | 10/1991 | Li | 395/500 |
| 5,123,107 | 6/1992 | Mensch, Jr. | 395/800 |

FOREIGN PATENT DOCUMENTS 0343770 11/1989 European Pat. Off. .

*Primary Examiner*—Alyssa H. Bowler
*Assistant Examiner*—Meng-Ai T. An
*Attorney, Agent, or Firm*—Foley & Lardner

[57] ABSTRACT

An integrated digital processing apparatus for use in a computing device. The apparatus comprises a central processor for effecting processing functions according to a program, a plurality of bus-accommodating devices for accommodating direct operative connection of peripheral devices via a plurality of buses, a single internal bus for accommodating communications internal of the apparatus among the central processing unit and the plurality of bus-accommodating devices, and an internal bus control for controlling utilization of the internal bus. The apparatus is, preferably, configured as an integrated digital circuit on a single substrate.

1 Claim, 1 Drawing Sheet

INTEGRATED DIGITAL PROCESSING APPARATUS HAVING A SINGLE BIODIRECTIONAL DATA BUS FOR ACCOMMODATING A PLURALITY OF PERIPHERAL DEVICES CONNECTED TO A PLURALITY OF EXTERNAL BUSES

CROSS REFERENCE TO RELATED APPLICATIONS

This application is a continuation of Ser. No. 07/576,012, filed Aug. 31, 1990, now abandoned.

The following applications contain subject matter similar to the subject matter of this application.

(TT0092) U.S. patent application Ser. No. 07/576,601, filed Aug. 31, 1990, pending; Attorney Docket No. 203 098, entitled "System for Effecting Communications Between a Computing Device and a Plurality of Peripheral Devices";

(TT0093) U.S. patent application Ser. No. 07/576,017, filed Aug. 31, 1990, now abandoned; Attorney Docket No. 203 099, entitled "Apparatus for Use with a Computing Device Controlling Communications with a Plurality of Peripheral Devices";

(TT0097) U.S. patent application Ser. No. 07/576,019, filed Aug. 31, 1990, now abandoned; Attorney Docket No. 203 159, entitled "System for Controlling Communications Among a Computer Processing Unit and a Plurality of Peripheral Devices";

(TT0098) U.S. patent application Ser. No. 07/576,061, filed Aug. 31, 1990, now U.S. Pat. No. 5,218,681; Attorney Docket No. 203 160, entitled "Apparatus for Controlling Access to a Data Bus"; and (TT0099) U.S. patent application Ser. No. 07/576,695, filed Aug. 31, 1990, now U.S. Pat. No. 5,060,138, filed Oct. 22, 1991; Attorney Docket No. 203 161, entitled "Apparatus for Use with a Computing Device for Generating a Substitute Acknowledgement to an Input when the Computing Device is in an Operational Hiatus".

BACKGROUND OF THE INVENTION

The present invention is directed to an apparatus for processing information. More specifically, the present invention is directed to an integrated digital processing apparatus preferably situated on a single substrate. The apparatus includes appropriate processing units and peripheral devices on board the single substrate to support a plurality of external data buses. All of the plurality of external data buses and support peripherals communicate with each other and with an on board (i.e., on board the single substrate) computer processing unit by a single internal data bus.

The present invention is designed, in its preferred embodiment, to provide a single, unified logic element configured to support a three-bus AT-type architecture computing system. The present invention provides the advantages of lower power, higher speed, and reduced real estate (i.e., reduced board space occupied) associated with an integrated circuit while providing direct connection of external data buses in operative connection with peripheral devices, main system memories (such as dynamic RAMs (DRAM)), read-only memories (ROMs), keyboard controllers, and numeric co-processors.

SUMMARY OF THE INVENTION

The invention is an integrated digital processing apparatus for use in a computing device. The apparatus comprises a central processor for effecting processing functions according to a program, a plurality of bus-accommodating devices for accommodating direct operative connection of peripheral devices via a plurality of buses, an internal bus for accommodating communications internal of the apparatus among the central processing unit and the plurality of bus-accommodating devices, and an internal bus control for controlling utilization of the internal bus.

The present invention is, preferably, configured as an integrated digital circuit on a single substrate.

It is, therefore, an object of this invention to provide a digital processing apparatus configured as an integrated circuit on a single substrate to accommodate a plurality of peripheral buses.

A further object of the present invention is to provide an integrated digital processing apparatus which has a single internal bus for internal communications among peripheral support devices and a computer processing unit.

Still a further object of this invention is to provide an integrated digital processing apparatus having lower power requirements, higher operating speed, and reduced real estate requirements than alternately designed apparata serving similar functions.

Further objects and features of the present invention will be apparent from the following specification and claims when considered in connection with the accompanying drawing illustrating the preferred embodiment of the invention.

DETAILED DESCRIPTION OF THE DRAWING

Figure 1:
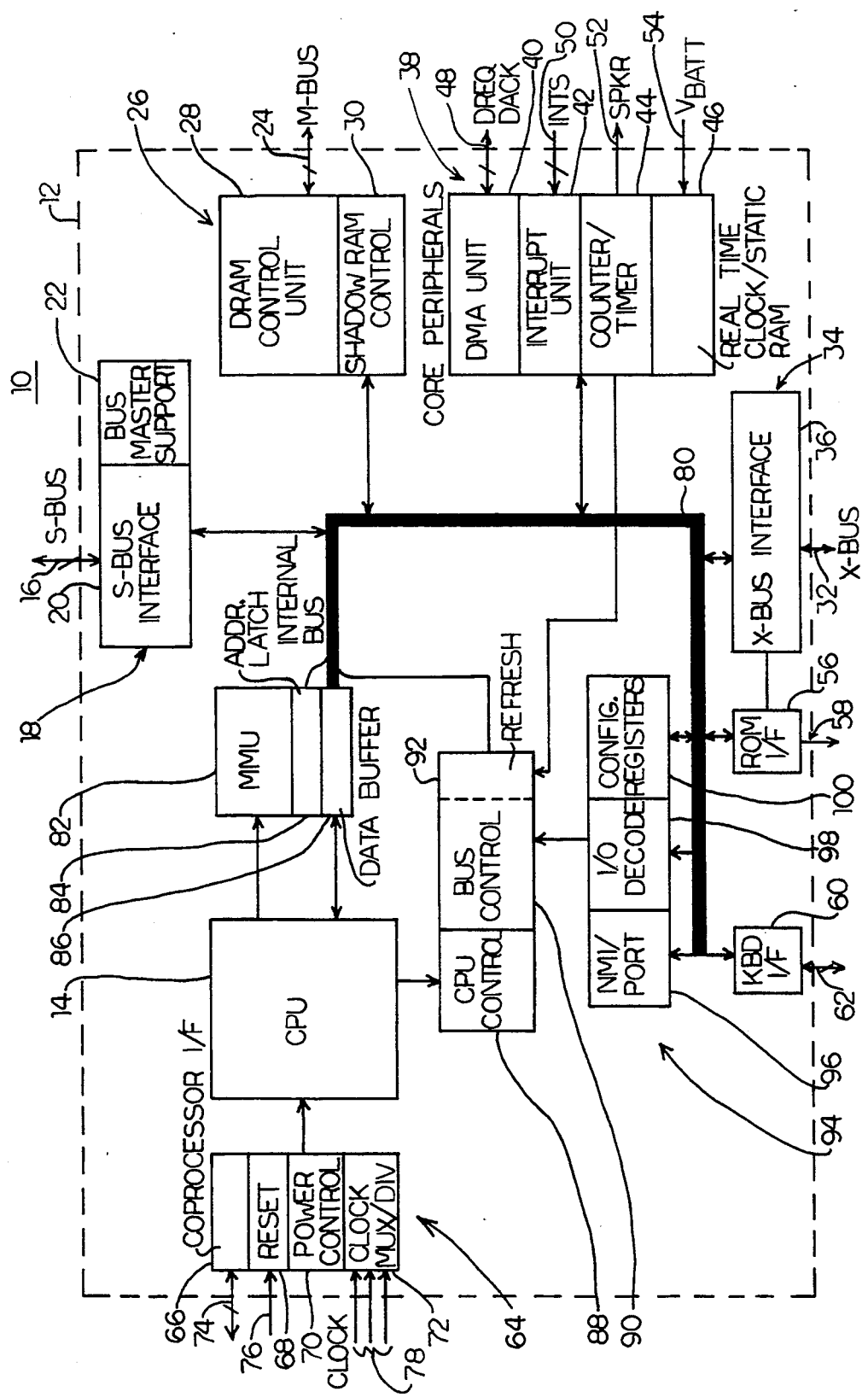

FIG. 1 is a system-level schematic drawing of the preferred embodiment of the present invention.

DETAILED DESCRIPTION OF THE INVENTION

FIG. 1 is a system-level schematic diagram of the preferred embodiment of the present invention. In FIG. 1, an apparatus 10 is illustrated as situated on a single substrate 12. Apparatus 10 includes a computer processing unit 14, a connection 16 for an S-bus (not shown) and supportive peripheral devices 18 comprising an S-bus interface circuit 20 and a bus master support circuit 22. S-bus supportive peripheral devices 18 are preferably configured to accommodate direct connection of an S-bus to apparatus 10 with no additional peripheral devices required for an effective operative connection.

Similarly, a connection 24 for an M-bus (not shown) has associated therewith M-bus supportive peripheral devices 26, including a dynamic random access memory (DRAM) control unit 28 and a shadow random access memory (RAM) control unit 30. Preferably, M-bus supportive peripheral devices 26 are configured to allow direct connection of the M-bus to M-bus connection 24 with no additional supportive peripheral devices required for an effective operative connection.

A connection 32 with an X-bus (not shown) is also provided for apparatus 10. Associated with X-bus connection 32 are X-bus supportive peripheral devices 34, including an X-bus interface 36. X-bus supportive peripheral devices 34 are preferably configured to allow direct connection of the X-bus to X-bus connection 32 with no additional peripheral devices required for an effective operative connection.

In the environment in which it is anticipated the preferred embodiment of the present invention would be employed, i.e., an AT-configured computing system, the S-bus is intended for use as a system-expansion bus to which would be connected industry-standard signal generators, timing devices, and other expansion cards and subsystems. Similarly, in such a preferred AT system configuration, the M-bus is used for communication to direct DRAM interfaces, while the X-bus is employed as an expansion bus to effect connection with such devices as read-only memories (ROMs), keyboard controllers, numeric co-processors, and the like.

Apparatus 10 further comprises a plurality of core peripheral devices 38 which include, by way of example, a direct memory access (DMA) unit 40, an interrupt unit 42, a counter/timer device 44, and a real time clock and static RAM device 46. The various core peripheral devices 38 are operatively connected to input-output pins in order to perform their intended function. Thus, DMA unit 40 is operatively connected with input-output pins 48 in order to receive data request signals (DREQ) and transmit data acknowledgement signals (DACK), interrupt unit 42 is operatively connected with input-output pins 50 in order to receive interrupt signals (Ints), counter/timer device 44 is operatively connected with input-output pins 52 to provide operative connection with a system speaker (Spkr), and real time clock and static RAM device 46 is operatively connected to input-output pins 54 in order to receive power from a power supply, such as VBatt.

While ROMs and keyboard controllers are connectable to apparatus 10 X-bus connection 32, the preferred embodiment of apparatus 10 illustrated in FIG. 1 also provides for direct ROM connection to a ROM interface 56 through an input-output pins 58. Similarly, a keyboard interface 60 is also provided for access to apparatus 10 via input-output pins 62.

Also illustrated in the system-level diagram of FIG. 1 are additional supportive peripheral devices 64, including a co-processor interface 66, a reset circuit 68, a power control circuit 70, and a clock multiplexer and divider unit 72. Input-output pins are provided for access to the various additional supportive peripheral devices 64 so that co-processor interface 66 is connected with input-output pins 74, reset circuit 68 is connected with input-output pins 76, and clock multiplexer divider unit 72 is connected with a plurality of input-output pins 78.

An internal bus 80 is provided to effect communications among the various components of apparatus 10, including S-bus supportive peripheral devices 18, M-bus supportive peripheral devices 26, X-bus supportive peripheral devices 34, core peripheral devices 38, and computer processing unit 14. Computer processing unit (CPU) 14 is operatively connected with internal bus 80 via memory management unit (MMU) 82 and its associated address latch 84 and data buffer 86.

Computer processing unit 14 is responsive to a CPU control device 88, which CPU control device 88 is in intimate communicational relation with a bus control device 90. Bus control device 90 is operatively connected with internal bus 80 and includes a refresh generator 92 which is responsive to counter/timer 44 to periodically refresh specified components of apparatus 10, such as dynamic RAMs (DRAMs) through DRAM control unit 28.

Internal supportive peripheral devices 94 are situated intermediate internal bus 80 and bus control circuit 90, including a non-maskable interrupt (NMI) control port 96, an input-output decode circuit 98, and configurable registers 100.

Thus, apparatus 10 provides appropriate bus-accommodating means such as S-bus supportive peripheral devices 18, M-bus supportive peripheral devices 26, and X-bus supportive peripheral devices 34, as well as ROM interface 56 and keyboard interface 60, to support direct connection of peripheral devices via data buses to apparatus 10 with no additional supportive peripheral devices required. Effective and efficient internal communications within apparatus 10 are provided by internal bus 80, access to which is controlled by bus control circuit 90 so that computer processing unit 14 may provide information to or receive information from any of the several supportive external buses via internal bus 80. Further, information may be exchanged among the various external buses according to bus control circuit 90, as dictated by the program driving computer processing unit 14, all via internal bus 80.

In its preferred embodiment, apparatus 10 is configured on a single substrate 12 as an integrated digital circuit, thereby providing the advantages of higher operating speed, lower power consumption, and reduced occupancy of "real estate" in its physical embodiment.

It is to be understood that, while the detailed drawing and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims:

We claim:

1. An integrated digital apparatus for use in a computing device, said computing device having a plurality of buses coupled with a plurality of peripheral devices, each respective bus of said plurality of buses being configured to operate with a predetermined class of peripheral devices of said plurality of peripheral devices; the apparatus comprising:

a central processing means for effecting processing functions according to a program;

a plurality of bus connection means for connecting said plurality of buses with the apparatus, each respective bus connection means being designated for connection with an associated bus of said plurality of buses;

a plurality of bus accommodating means for accommodating operative connection of said plurality of peripheral devices with the apparatus via said plurality of buses; said plurality of bus accommodating means including at least one respective bus accommodating means of said plurality of bus accommodating means coupled with an associated respective bus connection means of said plurality of bus connection means; each said at least one respective bus accommodating means being configured to allow direct connection with said associated respective bus with no additional supportive means required for effective operation of said predetermined class of peripheral devices via said associated respective bus;

a single internal bidirectional bus operatively connected with said plurality of bus accommodating means and with said central processing means for accommodating communications internal of the apparatus among said central processing means and said plurality of bus accommodating means; and an internal bus control means operatively connected with said central processing means and with said internal bidirectional bus for controlling utilization of said internal bidirectional bus; said internal bus control means utilizing said internal bidirectional bus to effect said communications in response to a plurality of addresses received from said central processing means, each of said bus accommodating means being uniquely identified by a respective address of said plurality of addresses;

each of said at least one respective bus accommodating means being tailored to said associated respective bus, said at least one respective bus accommodation means comprising appropriate respective bus control means for controlling operation of said associated respective bus;

said plurality of bus accommodating means being three bus accommodating means, said plurality of buses being three buses, and said at least respective bus accommodating means being one respective bus accommodating means;

said three buses comprising a card expansion bus, a memory bus, and an on-board expansion bus.

* * * * *